United States Patent [19]

Evans et al.

[11] Patent Number: 5,075,019
[45] Date of Patent: Dec. 24, 1991

[54] LOW SEDIMENT METHOD FOR PREPARING COPPER SALTS OF POLYOLEFINIC-SUBSTITUTED DICARBOXYLIC ACIDS

[75] Inventors: Joan M. Evans; Gordon F. Evans, both of Staten Island, N.Y.; Gregory C. Giffin, Martinsville, N.J.

[73] Assignee: Exxon Chemical Patents Inc., Linden, N.J.

[21] Appl. No.: 451,272

[22] Filed: Dec. 14, 1989

[51] Int. Cl.$^5$ .......................................... C10M 129/28
[52] U.S. Cl. ....................................... 252/34; 252/35; 562/590; 562/594
[58] Field of Search .................... 252/34, 35; 562/590, 562/594

[56]  References Cited

U.S. PATENT DOCUMENTS

| | | | |
|---|---|---|---|
| 3,163,603 | 12/1964 | LeSuer | 252/33.6 |
| 3,271,310 | 9/1966 | LeSuer | 252/35 |
| 3,652,616 | 3/1972 | Watson et al. | 260/429 R |
| 4,552,677 | 11/1985 | Hopkins | 252/33.6 |
| 4,751,011 | 6/1988 | Lundberg et al. | 252/35 |

FOREIGN PATENT DOCUMENTS 0273626 7/1988 European Pat. Off. .

Primary Examiner—Prince Willis, Jr.
Assistant Examiner—Jerry D. Johnson
Attorney, Agent, or Firm—J. B. Murray, Jr.

[57]   ABSTRACT

The present invention is directed to a low sediment method of producing oleaginous compositions containing copper salts of the product of a polyolefin having a numerical average molecular weight ($\overline{M}_n$) of at least 600 which has been substituted with an average of at least 0.5 dicarboxylic acid anhydride moiety per polyolefin molecule, wherein the polyolefin-substituted dicarboxylic acid anhydride is contacted with a water-soluble copper reactant in the presence of at least 1,000 wt. % above the amount theoretically required to hydrolyze the polyolefin-substituted dicarboxylic acid anhydride material charged) and in the presence of a solvent for the polyolefin-substituted dicarboxylic acid anhydride material charged. The resulting copper salt products, and amine derivatives thereof, are useful in lubricating oils as additives, e.g., as antioxidant lube oil additives.

22 Claims, No Drawings 5,075,019

LOW SEDIMENT METHOD FOR PREPARING COPPER SALTS OF POLYOLEFINIC-SUBSTITUTED DICARBOXYLIC ACIDS

FIELD OF THE INVENTION

This invention is directed generally to a low sediment process for preparing copper salts of polyolefinic substituted dicarboxylic acids.

BACKGROUND OF THE INVENTION

U.S. Pat. No. 3,163,603 discloses amide and imide derivatives of metal salts of substituted succinic acids and illustrates the preparation of Zn, Mg, Ce, K, Li and Na salts of polyisobutenyl succinic anhydride (wherein the polyisobutenyl group is derived from a polymer of at least about 980 average molecular weight wherein small amounts (up to about 3 wt. %) of water was added in the reaction mass, based on the polyisobutenyl succinic anhydride charged.

U.S. Pat. No. No. 3,271,310, to LeSuer, discloses the production of certain metals salts of hydrocarbyl-substituted succinic acids and anhydrides and teaches that it is necessary to incorporate water in the reactants in an amount up to about 15% of the weight of the succinic compound if the hydrocarbyl-substituted succinic anhydride form is employed in the charge. Examples of the use of varying amounts of water (in amounts of zero up to about 20 wt. %, based on the polyisobutenyl succinic anhydride charged) are shown for preparing certain salts of Ba, Pb, Na, Ca, Ni, Cd, K, Zn, Li, Sn, Co and Al.

U.S. Pat. No. 3,652,616 discloses compositions for fuels and lubricants prepared by (a) reacting a hydrocarbon-substituted succinic anhydride and certain alkylene polyamines, and (b) reacting the resulting material with a metallic reactant. The patent teaches that it is sometimes necessary to use a co-solvent to solubilize the anhydride, polyamine and/or metallic material, and indicates that water, methyl or ethyl alcohol, THF, DMSO, diglime, cellosolve, dioxane or dimethyl formamide may be used as a co-solvent.

U.S. Pat. No. 4,552,677 to Hopkins is an indication of prior art processes, wherein a copper compound such as cupric acetate hydrate, basic cupric acetate, cuprous carbonate, basic cupric carbonate, and cuprous or cupric hydroxide is introduced into a reaction vessel containing a $C_8$ to $C_{35}$ hydrocarbyl-substituted succinic anhydride. The patent illustrates preparation of copper salts with water added to the reactants in an amount of up to about 100 wt. % in excess of the amount of water theoretically required to hydrolyze the $C_8$ to $C_{35}$ hydrocarbyl-substituted succinic anhydrides charged.

U.S. Pat. No. 4,751,011 discloses compositions comprising an interactive viscosity modifying polymer and a (Group I or II) metal salt of polyolefin-substituted dicarboxylic acid or anhydride and describes that the metal salt co-additive can be prepared by first dissolving polyisobutenyl-substituted dicarboxylic acid in mineral oil solvent and then introducing a metal acetate along with a moderate amount of water. The patent (Example 6) illustrates the preparation of Cu-PIBSA using about 110 wt. % excess water above the stoichiometric amount of water to hydrolyze the polyisobutenyl-substituted succinic anhydride charged.

European Pat. No. Publication 273,626 discloses a method for preparing Group I-B and II-B metal salts of polyolefinic-substituted dicarboxylic acid anhydride from a Group I-B or II-B metal reactant (e.g., CuO, ZnO, $Cu(OH)_2$, $CuCO_3$ and the like), polyolefinic-substituted dicarboxylic acid anhydride and a short chain carboxylic acid (e.g., acetic acid), and discloses adding water to the reactor in an amount preferably from 1 to 200 wt. % excess water above the stoichiometric amount required to hydrolyze the anhydride groups to facilitate reaction of the acid groups with the Group I-B or II-B metal reactant, in combination with copper oxide (a water insoluble metal compound), acetic acid and the polyolefinic-substituted dicarboxylic acid anhydride. The Examples employ water added in a 1,360 wt. % excess above the theoretical hydrolysis amount.

Co-pending Serial No. 306,117, filed Feb. 6, 1989, discloses the preparation of copper salts of polyisobutenyl succinic anhydride wherein water may be added to facilitate reaction with the anhydride material, and illustrates preparation of a series of copper products employing cupric acetate monohydrate, polyisobutenyl succinic anhydride and water added in amounts of from about 160 to 465 wt. % excess above the amount theoretically required to hydrolyze the anhydride material charged.

SUMMARY OF THE INVENTION

The present invention is directed to a low sediment method of producing oleaginous compositions containing copper salts of the product of a polyolefin having a number average molecular weight ($\overline{M}_n$) of at least 600 which has been substituted with an average of at least 0.5 dicarboxylic acid anhydride moiety per polyolefin molecule, wherein the polyolefin-substituted dicarboxylic acid anhydride is contacted with a water-soluble copper reactant in the presence of water added in an amount of at least 1,000 wt. % above the amount theoretically required to hydrolyze the polyolefin-substituted dicarboxylic acid anhydride material charged, and preferably in the presence of a solvent for the polyolefin-substituted dicarboxylic acid anhydride material charged.

The copper salts (and their derivatives) have a variety of utilities as, for example, compatibilizing agents, dispersants or antioxidants in lubricating oil formulations.

DESCRIPTION OF THE PREFERRED EMBODIMENT

Polyolefinic Substituted Dicarboxylic Acids

The polyolefinic substituted dicarboxylic acid anhydrides preferred for treatment in this invention comprise long chain olefinic-substituted dicarboxylic acid anhydrides which include long chain hydrocarbons, generally olefin polymers which are substituted with alpha or beta unsaturated $C_4$ to $C_{10}$ dicarboxylic acid anhydride groups (e.g., derived from itaconic acid, maleic acid, maleic anhydride, chloromaleic acid, dimethyl fumarate, chloromaleic anhydride and mixtures thereof).

Preferred olefin polymers from which the polyolefinic substituted dicarboxylic acid moieties of the metal salts are derived are those polymers made up of a major molar amount of $C_2$ to $C_{10}$ monoolefin, e.g., $C_2$ to $C_5$, monoolefin. Such olefins include ethylene, propylene, butylene, isobutylene, pentene, octene-1, styrene, etc. The polymers may be homopolymers such as polyisobutylene or copolymers of two or more of such olefins.

These include copolymers of: ethylene and propylene; butylene and isobutylene; propylene and isobutylene; etc. Other copolymers include those in which a minor molar amount of the copolymer monomers, e.g., 1 to 10 mole percent, is a $C_4$ to $C_{18}$ diolefin, e.g., copolymers of isobutylene and butadiene; or copolymers of ethylene, propylene and 1,4-hexadiene, 5-ethylidene-2-norbornene; etc.

In some cases, the olefin polymer may be completely saturated, for example, an ethylene-propylene copolymer made by a Ziegler-Natta synthesis using hydrogen as a moderator to control molecular weight.

The olefin polymers will usually have number average molecular weights ($\overline{M}_n$) above about 600. Particularly useful olefin polymers have number average molecular weights within the range of about 900 and about 5,000 (e.g., from about 900 to 1,300) with approximately one double bond per polymer chain. An especially suitable starting material is polyisobutylene. The number average molecular weight for such polymers can be determined by several known techniques. A convenient method for such determination is by gel permeation chromatography (GPC) which additionally provides molecular weight distribution information (see W. W. Yua, J. J. Kirkland and D. D. Bly, "Modern Size Exclusion Liquid Chromatography," John Wiley and Sons, New York, 1979).

The polyolefin-substituted anhydride starting material may be prepared, by known means, by reacting the olefin polymer with a $C_{4-10}$ unsaturated dicarboxylic acid or anhydride. For example, the olefin polymer and the dicarboxylic acid material may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8, preferably 3 to 7 weight percent chlorine, or bromine, based on the weight of polymer, by passing the chlorine or bromine through the polyolefin at a temperature of 100° to 250°, e.g., 140° to 225° C. for about 0.5 to 10, e.g., 3 to 8 hours. Processes of this general type are taught in U.S. Pat. Nos. 3,087,436; 3,172,892; 3,272,746 and others.

Alternatively, the olefin polymer, and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

By the use of halogen, about 65 to 95 weight percent of the polyolefin will normally react with the dicarboxylic acid material. Thermal reactions, those carried out without the use of halogen or a catalyst, cause only about 50 to 75 weight percent of the polyisobutylene to react. Chlorination obviously helps to increase the reactivity.

Preferred polyolefinic substituted dicarboxylic acid anhydrides are polyisobutenyl succinic anhydride, polybutenyl succinic anhydride, and mixtures thereof.

Copper Reactants

The copper reactants useful in this invention are water-soluble copper salts (cuprous salts, cupric salts, or mixtures thereof). The copper reactant will be preferably characterized by a solubility in water of at least 1 gram of copper reactant per 100 grams of water, as determined at 70° C. Suitable copper reactants include the lower carboxylates (e.g., salts of $C_1$ to $C_4$ monocarboxylic acids, or salts of $C_2$ to $C_4$ dicarboxylic acids), copper cyanates, copper thiocyantes, copper isothiocyanates, isocyanurates, copper halides (e.g., copper chlorides, copper bromides, copper iodides, etc.), copper sulfates, copper perchlorates, copper nitrates, copper nitrites, copper fluorborates, copper borates, copper perchlorates, copper dichromates, copper fluosilicates, copper lactates, copper salicylates, copper selenates, mixtures of any of the foregoing, and hydrated derivates of the above, and the like. Examples of such copper reactants are cupric propionate, cupric acetate, cupric metaborate, cupric benzoate, cupric formate, cupric laurate, cupric nitrite, cupric oxychloride, cupric palmitate, cupric salicylate, cupric chlorate, cupric formates, cupric tartrate, cupric benzoate, $Cu(NH_3)_6Cl_2$, $[Cu(NH_3)_4]S_2O_6$, $[Cu(NH_3)_4](NO_3)_2$, $[Cu(NH_3)_4](NO_2)_2$, $[Cu(NH_3)_4]SO_4$, $CuCl.3[CS(NH_2)_2]$, copper pyridine chloride, cupric perchlorate, cupric dichromate, cupric fluosilicate, cupric dichromate, cupric lactate, cupric selenate and hydrates, such as cupric acetate hydrate $[Cu(C_2H_3O_2)_2.H_2O\ ]$, basic cupric acetate $(CuC_2H_3O_2\ )_2.CuO.6H_2O\ ]$ and the like. Especially preferred are cupric acetate, cupric formate and hydrates thereof.

The copper reactant salts used in this invention can be prepared by procedures known to those of skill in the art. Therefore, detailed discussion is unnecessary.

The copper reactants in this invention can be used aong or in admixture with one or more added water soluble salts of metals of Groups I-A, II-A, II-B, IV-B, VI-B, VII-B and VIII of the Periodic Table to prepare mixed metal salts of the polyolefinic-substituted acid materials, e.g., at least one metal selected from the group consisting of lithium, sodium, potassium, rubidium, cesium, magnesium, calcium, barium, strontium, zinc, iron, nickel, cobalt and molybdenum, with Mo, Ni, Co and Zn, being especially preferred. Useful added metal reactants include the nitrates, halides, lower carboxylates, bromates, benzoates, chlorates, perchlorates, sulfates, and borates of the foregoing metals. These metals are the so-called transition or co-ordination metals, i.e., they are capable of forming complexes by means of their secondary or coordination valence. Specific examples of the added complex-forming metal compounds useful as the reactant in this invention are cobaltous nitrate, cobaltic acetate, cobaltous chloride, cobaltic chloride, cobaltic benzoate, cobaltic bromate, cobalitic bromide, cobaltic chromate, cobaltic perchlorate, chromous acetate, chromic acetate, chromic bromide, chromous chloride, chromic sulfate, chromous sulfate heptahydrate, chromic sulfate, chromic formate, manganous acetate, manganous benzoate, manganese dichloride, manganese trichlordie, manganous citrate, manganous formate, manganous nitrate, manganous chlorate, manganese bromide, manganese chromate, manganous valerate, ferrous acetate, ferric benzoate, ferrous bromide, ferric formate, ferrous lactate, ferrous nitrate, ferric sulfate, nickel dibromide, nickel dichloride, nickel nitrate, nickel dioleate, nickel stearate, zinc benzoate, zinc boarate, zinc bromide, zinc chromate, zinc dichromate, zinc iodide, zinc lactate, zinc nitrate, zinc sulfite, lead acetate, lead citrate, lead chloride, lead fluoride, lead iodide, lead nitrate, nickel chloride, nickel bromide, nickel fluoride, nickel methylate, cadmium benzoate, cadmium acetate, cadmium fumariate, cadmium nitrate, cadmium iodate and cadmium iodide. Hydrates of the above compounds are especially convenient for use in the process of this invention.

Preferably the salts formed in this invention contain up to about one equivalent of copper for each equivalent of free carboxylic acid. More preferably, the copper produce salts contain from about 0.1 up to about 0.75 equivalent of copper per equivalent of free carboxylic acid. The most preferred metal salts are those containing about 0.5 equivalents of copper per equivalent of free carboxylic acid.

The copper ions of the copper product salts of this invention can be any of its possible oxidation states, although the most stable oxidation states are preferred, i.e., Cu(I) and Cu(II). The oxidation states are identified by their valence numbers. The oxidation state of +1 is identified by a valence of 1 (e.g., Cu having an oxidation state of +1 has a valence of 1 and is noted by the chemical symbol for copper followed by the (I), Cu(I)).

Copper has the oxidation states +1, +2 and +3; however, the oxidation state of +2 is the most stable and therefore the preferred oxidation state.

Especially preferred are copper and mixed copper and zinc salts of polyisobutenyl succinic anhydride wherein the polyisobutenyl group is derived from a polyisobutylene polymer having a number average molecular weight of from about 900 to about 3,000 (e.g., 900 to 1,300), and a molecular weight distribution (ratio of $\overline{M}_w/\overline{M}_n$) of from about 1.4 to 4.0, preferably from about 1.5 to 3.0.

Low Sediment Process

According to the process of this invention, the selected water soluble copper reactant, and polyolefin-substituted dicarboxylic acid anhydride are contacted in the presence of water charged in an amount (herein referred to as the "wt. % excess water") of at least 1,000 wt. % above that theoretically required to hydrolyze the anhydride groups of the polyolefin-substituted dicarboxylic acid anhydride charged. The amount of water theoretically required to hydrolyze the anhydride groups of the polyolefin-substituted dicarboxylic acid anhydride charged can be determined by titration of a sample of the anhydride-containing material with a suitable base, such as KOH, employing the ASTM Method D94. The resulting Saponifcatoin Number is defined as the number of milligrams of KOH used to raise the pH of one gram of sample under aqueous conditions to about 9.0. (The pH can be determined by the use of an indicator that changes color in the range of 8.0 to 10.0 such as phenol phthalein or by electrical means such as a pH-meter.)

The amount of excess water added with the charge to the reaction vessel will generally comprise from about 1,000 to 20,000 wt. % excess water, preferably from about 1,500 to 10,000 wt. % excess water, and most preferably from about 2,000 to 8,000 wt. % excess water.

The polyolfinic-substituted dicarboxylic acid anhydride, copper reactant and water are contacted for a time and under conditions sufficient to form the desired copper salt of the polyolefinic substituted dicarboxylic acid. Generally, the reaction will be carried out at elevated temperatures, usually at a temperature of at least about 90° C. up to the decomposition point of the metal salt product. Generally, the temperature will range from about 90° C. to 130° C., and preferably from about 90° C. to 110° C., for a time of from about 1 to 20 hours, preferably from about 3 to 12 hours.

The process can be carried out in a batchwise, continuous or semicontinuous manner, and the order in which the reactants and water are charged to the reaction vessel is not critical. The copper reactant, anhydride material, and water may be added simultaneously or sequentially in any order, and any of the reactants in water may be premixed prior to introduction into the reaction vessel. If desired, water can be added intermittently (or any of the other charged materials) to the reaction zone. Generally, however, the polyolefin-substituted dicarboxylic acid anhydride will be charged, together with any solvent (such as lubricating oil), followed by addition, with stirring, of the water and copper reactant. Preferably, the copper reactant and water are added as an aqueous mixture (and, preferably, an aqueous solution) of the copper reactant.

The reaction mixture should be stirred or otherwise agitated during the reaction. It is not critical that the reaction mixture be conducted in an inert atmosphere, and air may be employed as the gas above the reaction mixtures liquid level.

The apparatus employed for carrying out the reaction can be any of those apparatus which are conventionally employed for liquid reactions, including one or more stirred tank reactors (which are preferred), tubular reactors and the like.

The reaction mixture can then be treated to remove water and recover improved low sediment product mixture containing the copper salt of the polyolefin-substituted dicarboxylic acid. For example, the reaction medium can be distilled or stripped with an inert gas (e.g. $N_2$ gas stripping for from 1 to 15 hours, preferably from 3 to 10 hours, at a temperature of from 90° to 130° C., preferably from 95° to 120° C.) to remove the water. The application of a vacuum (e.g., 1 to 90 kPa, preferably 20 to 70 kPa) above the reaction liquid can facilitate the removal of water.

The product salt of this invention can comprise an acid or neutral salt of the selected polyolefinic dicarboxylic acid material. By "acid salt" is meant a material which is a half-salt of the dicarboxylic acid, that is a material wherein one of the carboxy groups is a —COOMe group, wherein "Me" is the metal, and the other is an acid —COOH group. By "neutral salt" is meant a material in which both carboxy groups of the dicarboxylic acid material form salts of the metal.

The low sediment product mixture produced by this invention can then be employed, without filtration, centrifuging or other conventional treatments for solids removal, in lubricating oils as described more fully below, and will generally have a level of sediment of less than 1 vol. %, preferably less than 0.5 vol. %, and more preferably less than 0.3 vol. % sediment. As used herein, the volume % sediment is determined on a product mixture sample as withdrawn from the reaction zone, prior to filtration, or other sediment removal steps (while the product mixture is in a well mixed state) as follows: to 25 cc of the sample is added 75 cc heptane and the resulting mixture is placed in a graduated centrifuge tube which is then centrifuged at 1600 rpm for 20 minutes; the resulting sediment in the base of the centrifuge tube is then expressed in units of volume sediment relative to the volume of the product mixture sample employed. Samples of the product mixture can be directly withdrawn from the reaction zone by a pipette, a liquid withdrawal conduit or other means.

This invention will be further understood by reference to the following examples, wherein all parts are parts by weight, unless otherwise noted. The examples are intended only to exemplify the invention and not limit it in any way. In the Examples, the term "Sap. No." refers to the saponification number of the indicated materials, in units of mg KOH/g., as determined by ASTM Method D94.

EXAMPLES

Example 1-5

In a series of experiments, 723 grams of a mineral lubricating oil solution of polyisobutenyl-substituted succinic anhydride (PIBSA) (Saponification No. 112; 90 wt. % active ingredient) derived from a 950 number average molecular weight polyisobutylene, after dilution with 167 grams of S150N mineral oil, 147 grams (0.734 moles) of cupric acetate monohydrate (31.3 wt. % copper), 396 grams of diluent oil solvent (150N mineral oil) and the selected amount of water are added to a stirred reaction flask equipped with a reflux condenser,. The order of addition of these charged materials, the amount of water employed and other conditions of the experiments are indicated in Table I below. The reaction mass was heated with stirring to the indicated reaction temperature which was maintained for the reaction times as indicated. Thereafter, the reaction liquid was stripped for the indicated times with dry nitrogen gas charged to the liquid reaction mixture at a flow rate of 500 cubic centimeters per minute, while applying a vacuum above the reaction liquid as indicated.

The results thereby obtained are also set forth in Table I.

TABLE I

| Example: | Comp. A | 1 | 2 | 3 | 4 | 5 |
| --- | --- | --- | --- | --- | --- | --- |
| Water (g) | 100 | 200 | 835 | 835 | 835 | 835 |
| Water (% excess)[(1)] | 670 | 1,440 | 6,300 | 6,300 | 6,300 | 6,300 |
| Reaction Time (hrs.) | 10 | 10 | 10 | 5 | 2.5 | .10 |
| Reaction Temp. (°C.) | 102 | 102 | 102 | 102 | 98 | 91–100 |
| Strip (hrs.) | 3 | 3 | 4 | 6 | 9 | 10 |
| Strip Temp. (°C.) | 120 | 120 | 120 | 95–120 | 94–120 | 98–120 |
| Strip Vacuum (kPa) | 53.7 | 53.7 | 53.7 | 18–53.7 | 28–53.7 | 20–53.7 |
| Sediment (vol. %) | 1.2 | 0.80 | 0.12 | 0.16 | 0.20 | 0.12 |

Addition order =
Comp. A: PIBSA/oil; + copper acetate; + water.
Ex. 1: PIBSA/oil; + water; + copper acetate.
Ex. 2: PIBSA/oil; + water (12 wt. % total water charge); + aqueous copper acetate solution (88 wt. % total water charge).
Exs. 3–5: Water; + copper acetate; + PIBSA/oil.

[(1)]Wt. % excess water over the amount of water (13 g.) theoretically required to hydrolyze the anhydride groups of the added PIBSA.

The above data illustrate the superior low sediment levels obtained in use of the process of this invention in Experiments 1–5, as compared to the method of Comparative Experiment A.

The copper salts prepared in the process of this invention can be employed in lubricating oils directly, or can be further reacted or complexed in a separate step with an amine, as described in co-pending patent application Ser. No. 306,117, filed Feb. 6, 1989, (the disclosure of which is hereby incorporated in its entirety) to provide oleaginous compositions having a significantly reduced viscosity and to improve the resistance against viscosity growth of such compositions during storage. In this further treatment step, the low sediment copper salt product prepared by the process of this invention is contacted with an amine selected from the group consisting of aliphatic, cycloaliphatic and aromatic amines containing from 1 to 4 nitrogen atoms per molecule, the amine having at least one primary or secondary nitrogen atom per molecule, under conditions sufficient to affect reaction or complexation of the amine with at least a portion of the polyolefin-substituted dicarboxylic acid copper salt.

These amines may be hydrocarbyl amines or may be hydrocarbyl amines including other groups, e.g, hydroxy groups, alkoxy groups, amide groups, nitriles, imidazoline groups, and the like. Hydroxy amines with 1 to 3 hydroxy groups, preferably 1 hydroxy group, are particularly useful. Preferred amines are aliphatic saturated amines, including those of the general formulas:

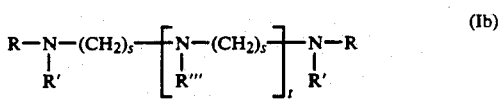

wherein R, R', R" and R''' are independently selected from the group consisting of hydrogen; $C_1$ to $C_{25}$ straight or branched chain alkyl radicals; and $C_1$ to $C_{12}$ alkoxy $C_2$ to $C_6$ alkylene radicals; and wherein R''' can additionally comprise a moiety of the formula:

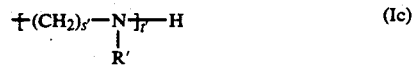

wherein R' is as defined above, and wherein each s and s' can be the same or a different number of from 2 to 6, preferably 2 to 4; and t and t' can be the same or different and are each numbers of typically from 0 to 2, preferably 1, with the proviso that the amine contains not greater than 4 nitrogen atoms. To assure a facile reaction it is preferred that R, R', R", R''', (s), (s'), (t) and (t') be selected in a manner sufficient to provide the compounds of formulas Ia and Ib with typically at least one primary amine group, preferably two primary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine and triethylene tetramine; 1,2-propylene diamine; polypropylene amines such as di-(1,2-propylene)triamine and di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 2-propyldodecylamine; N-dodecyl-1,3-propylene diamine; diisopropanol amine; diethanol amine; amino morpholines such as N-(3-aminopropyl) morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (II):

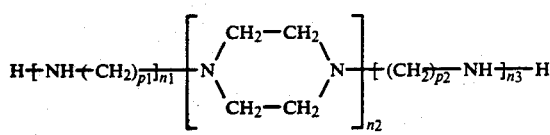

wherein $p_1$ and $p_2$ are the same or different and are each integers of from 1 to 4, $n_1$ and $n_3$ are the same or different and are each integers of from 0 to 3, and $n_2$ is 0 or 1, with the proviso that the sum of $n_1$, $n_2$ and $n_3$ is not greater than 3. Non-limiting examples of such amines include N-(2-aminoethyl) piperazine.

Commercial mixtures of amine compounds may advantageously be used, provided they contain an average of not greater than about 4 nitrogen atoms per molecule. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine and corresponding piperazines.

Useful amines also include polyoxyalkylene polyamines such as those of the formulae:

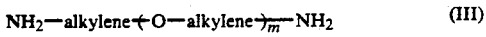

where m has a value of about 1 to 2; and

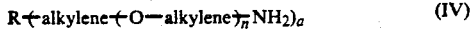

where "n" has a value of about 1 to 2, and R is a substituted saturated hydrocarbon radical of from 1 to 3 carbon atoms, wherein the number of substituents on the R group is represented by the value of "a", which is a number from 1 to 3. The alkylene groups in either formula (III) or (IV) may be straight or branched chains containing about 2 to 4 carbon atoms.

Useful as aromatic amines in the process of this invention include compounds of the formula:

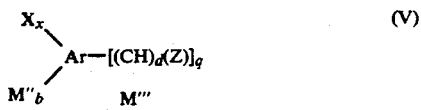

wherein Ar is an aromatic radical of from 6 to 20 carbon atoms, X is halide, —OH, or —OR$_4$, M" is substituted or unsubstituted hydrocarbyl, M'" is H or substituted or unsubstituted hydrocarbyl, Z is an amine moiety containing from 1 to 4 nitrogen atoms, "x" is an integer of from 0 to 3, "b" is an integer of from 0 to 2, "q" is an integer of from 1 to 3, "d" is 0 or 1, with proviso that the sum of x, q and b is from 1 to "v", wherein "v" is the total number of available bonding sites on the unsubstituted Ar radical.

Z can therefore comprise an amine moiety derived from any of the aliphatic or cycloaliphatic amines discussed above. Illustrative of such Z moieties are those of the formula:

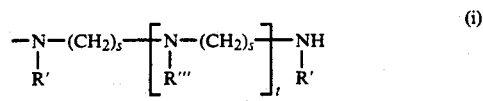

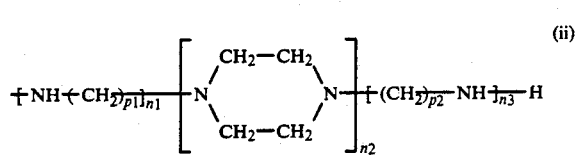

—NH—alkylene—(O—alkylene)$_m$—NH$_2$ (iii)

wherein R', R", R'", s and t are as defined above with respect to Formula Ib; $p_1$, $p_2$, $n_1$ and $n_2$ are as defined above with respect to Formula II; and "alkylene" and "m" are as defined above with respect to Formula III;

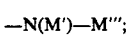

wherein M' and M'" are independently H or substituted or unsubstituted hydrocarbyl; and

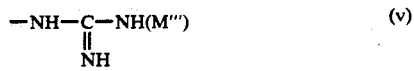

wherein M'" is as defined above,

When M" and M'" are hydrocarbyl, they could each contain up to about 300 carbon atoms, and will therefore include $C_1$ to $C_{300}$ (and preferably $C_1$ to $C_{24}$) alkyl, $C_2$ to $C_{20}$ alkenyl, $C_6$ to $C_{20}$ aryl, $C_7$ to $C_{20}$ alkaryl, $C_7$ to $C_{20}$ aralkyl, $C_3$ to $C_{10}$ heterocyclic and $C_3$ to $C_{10}$ cycloalkyl. Examples of such groups are methyl, ethyl, propyl, butyl, iso-butyl, sec-butyl, ter-butyl, pentyl, hexyl, heptyl, octyl, nonyl, decyl, undecyl, dodecyl, tridecyl, tetradecyl, ethenyl, propenyl, butenyl, pentenyl, hexenyl, heptenyl, octenyl, nonenyl, decenyl, undecenyl, dodecenyl, tridecenyl, tetradecenyl, phenyl, naphthyl, tolyl, xylyl, benzyl, ethylbenzyl, propylbenzyl, cyclopropyl, cyclobutyl, cyclopentyl, cyclohexyl, cycloheptyl, cyclooctyl, cyclononyl, cyclodecyl, and tetrahydrofuryl.

It is to be understood that the term "aromatic radical" as used in the specification and the appended claims is not intended to limit the divalent aromatic moiety represented by Ar to benzene. Accordingly, it is to be understood that the aromatic moiety can be a single aromatic nucleus such as a benzene nucleus, a pyridine nucleus, a thiophene nucleus, a 1,2,3,4-tetrahydronaphthalene nucleus, etc., or any polynuclear aromatic moiety. Such polynuclear moieties can be of the fused type; that is, wherein at least one aromatic nucleus is fused at two points to another nucleus such as found in naphthalene, anthracene, the azanaphthalenes, etc. Alternatively, such polynuclear aromatic moieties can be of the linked type wherein at least two nuclei (either mono- or polynuclear) are linked through bridging linkages to each other. Such bridging linkages can be chosen from the group consisting of carbon-to-carbon single bonds, ether linkages, keto linkages, sulfide linkages, polysulfide linkages of 2 to 6 sulfur atoms, sulfinyl linkages, sulfonyl linkages, methylene linkages, alkylene linkages, di-(lower alkyl)-methylene linkages, lower alkylene ether linkages, alkylene keto linkages, lower alkylene sulfur linkages, lower alkylene polysulfide linkages of 2 to 6 carbon atoms, amino linkages, polyamino linkages and mixtures of such divalent bridging linkages.

When the aromatic moiety, Ar, is a linked polynuclear aromatic moiety it can be represented by the general formula

wherein w is an integer of 1 to about 4, preferably 0 or 1; Ar in each instance in which it occurs is independently an aromatic moiety as described above, and each "Lng" is a bridging linkage individually chosen from the group consisting of carbon-to-carbon single bonds, ether linkages (e.g. —O—), keto linkages (e.g.,

sulfide linkages (e.g., —S—), polysulfide linkages of 2 to 6 sulfur atoms (e.g., —S$_2$—), sulfinyl linkages (e.g., —S (O)—) sulfonyl linkages (e.g., —S (O)$_2$—) lower alkylene linkages (e.g.,

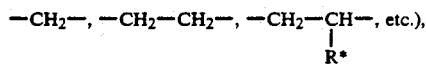

di-(lower alkyl)-methylene linkages (e.g., —CR*$_2$—), lower alkylene ether linkages (e.g.,

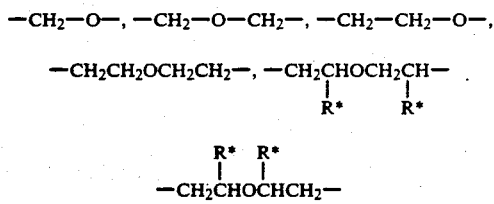

etc.) lower alkylene sulfide linkages (e.g., wherein one or more —O— atoms in the lower alkylene ether linkages is each replaced with an —S— atom), lower alkylene polysulfide linkages (e.g., wherein one or more —O— atoms is each replaced with a —S$_2$ to —S$_6$— group), with R* being a lower alkyl group.

Illustrative of such Ar groups are

and naphthylene,

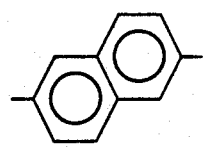

wherein r" is an integer of from 1 to 4, such as phenylene

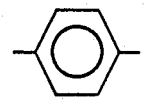

biphenylene,

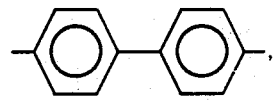

and the like.

The Ar group will be preferably phenyl or phenyl substituted with 1 to 3, preferably 1 to 2, M" hydrocarbyl groups (e.g., alkyl groups containing 1 to 300 carbon atoms), and with either 1 to 3 halogen X radicals, (e.g., chloro-, bromo-, or iodo-) or with to 3 hydroxy or C$_1$ to C$_6$ alkoxy or cycloalkoxy X groups. Examples of such substituted aryl radicals are 3-hydroxy-2,4-ditertiarybutyl phenyl, 3-hydroxy-2,4-dipropyl phenyl, 3-hydroxy-2,4-diisopropyl phenyl, 3-hydroxy-2,4-dimethyl phenyl, 3-hydroxy-2,4-dicyclohexyl phenyl, 3-methoxy-2,4-ditertiarybutyl phenyl, 3-methoxy-2,4-dipropyl phenyl, 3-methoxy-2,4-diisopropyl phenyl, 3-methoxy-2,4-dimethyl phenyl, 3-methoxy-2,4-dicyclohexyl phenyl, 3-chloro-2,4-ditertiarybutylphenyl, 3-chloro-2,4-dipropyl phenyl, 3-chloro-2,4-diisopropyl phenyl, 3-chloro-2,4-dimethyl phenyl, 3-chloro-2,4-dicylcohexyl phenyl, 3-chloro-2,6-dimethyl phenyl, 3-chloro-2,4,6-trimethyl phenyl, 4-chloro-2-isopropyl phenyl, 3-methyoxy phenyl, 2-methoxy phenyl, and the like.

When "d" is zero in the above formula V, illustrative of aromatic amines are those of the formula:

wherein Ph is phenyl and wherein X, x, Z, M", q and b are as follows:

TABLE A

| X | x | M" | b | Z | q |
|---|---|---|---|---|---|
| — | 0 | —C$_2$H$_5$OH | 1 | —NH$_2$ | 1 |
| — | 0 | —C$_2$H$_5$Ph | 1 | —NH$_2$ | 1 |
| — | 0 | —CH$_3$ | 1 | —NH$_2$ | 1 |
| — | 0 | —CH$_3$ | 1 | —NH$_2$ | 2 |
| — | 0 | —CH$_3$ | 1 | —NH$_2$ | 3 |
| — | 0 | —OCH$_3$ | 1 | —NH$_2$ | 1 |
| — | 0 | —OCH$_3$ | 1 | —NH$_2$ | 2 |
| — | 0 | —OCH$_3$ | 1 | —NH$_2$ | 3 |
| — | 0 | —C$_2$H$_5$ | 1 | —NH$_2$ | 1 |
| — | 0 | —OC$_2$H$_5$ | 1 | —NH$_2$ | 1 |
| —OH | 1 | — | 0 | —NH$_2$ | 1 |
| —Cl | 1 | — | 0 | —NH$_2$ | 1 |
| —OH | 1 | —CH$_3$ | 1 | —NH$_2$ | 1 |
| —Cl | 1 | —CH$_3$ | 1 | —NH$_2$ | 1 |
| —OH | 1 | —C$_2$H$_5$ | 1 | —NH$_2$ | 1 |
| —Cl | 1 | —CH$_3$ | 1 | —NH$_2$ | 1 |
| —OH | 1 | —C$_3$H$_7$ | 1 | —NH$_2$ | 1 |
| —OH | 1 | —C$_3$H$_7$ | 2 | —NH$_2$ | 2 |
| —OH | 1 | — | 0 | —NH$_2$ | 2 |
| —Cl | 1 | — | 0 | —NH$_2$ | 2 |
| —OH | 1 | —CH$_3$ | 1 | —NH$_2$ | 2 |
| —Cl | 1 | —CH$_3$ | 1 | —NH$_2$ | 2 |
| —OH | 1 | —C$_2$H$_5$ | 1 | —NH$_2$ | 2 |
| — | 0 | — | 0 | —NH$_2$ | 1 |
| — | 0 | — | 0 | —NH$_2$ | 2 |

TABLE A-continued

| X | x | M" | b | Z | q |
|---|---|----|---|---|---|
| — | 0 | — | 0 | —NH$_2$ | 3 |
| —OH | 1 | — | 0 | —NHCH$_3$ | 1 |
| —Cl | 1 | — | 0 | —NHCH$_3$ | 1 |
| —OH | 1 | —CH$_3$ | 1 | —NHCH$_3$ | 1 |
| —Cl | 1 | —CH$_3$ | 1 | —NHCH$_3$ | 1 |
| —OH | 1 | —C$_2$H$_5$ | 1 | —NHCH$_3$ | 1 |
| —Cl | 1 | —CH$_3$ | 1 | —NHCH$_3$ | 1 |
| —OH | 1 | —C$_3$H$_7$ | 1 | —NHCH$_3$ | 1 |
| —OH | 1 | —C$_3$H$_7$ | 2 | —NHC$_2$H$_5$ | 2 |
| —OH | 1 | — | 0 | —NHC$_2$H$_5$ | 2 |
| —Cl | 1 | — | 0 | —NHC$_2$H$_5$ | 2 |
| —OH | 1 | —CH$_3$ | 1 | —NHC$_2$H$_5$ | 2 |
| —Cl | 1 | —CH$_3$ | 1 | —NHC$_2$H$_5$ | 2 |
| —OH | 1 | —C$_2$H$_5$ | 1 | —NHC$_2$H$_5$ | 2 |
| — | 0 | — | 0 | —NHC(=NH)NH$_2$ | 1 |
| — | 0 | — | 0 | —NHC(=NH)NH(CH$_3$) | 1 |
| — | 0 | —Ph | 0 | —NHC$_2$H$_5$ | 2 |
| — | 0 | —Ph(CH$_3$) | 0 | —NHC$_2$H$_5$ | 3 |
| — | 0 | —Ph(CH$_3$)$_2$ | 0 | —NHPh | 1 |
| — | 0 | —PhNH$_2$ | 0 | —NHPh | 2 |
| — | 0 | —C$_2$H$_5$OH | 1 | —NHPh | 1 |
| — | 0 | —C$_2$H$_5$Ph | 1 | —NHPh | 1 |
| — | 0 | —CH$_3$ | 1 | —NHPh | 1 |
| — | 0 | —CH$_3$ | 1 | —NHPh | 2 |
| — | 0 | —CH$_3$ | 1 | —NHPh | 3 |
| — | 0 | —OCH$_3$ | 1 | —NHPh | 1 |
| — | 0 | —OCH$_3$ | 1 | —NHPh | 2 |
| — | 0 | —OCH$_3$ | 1 | —NHPh | 3 |
| — | 0 | —C$_2$H$_5$ | 1 | —NHPh | 1 |
| — | 0 | —OC$_2$H$_5$ | 1 | —NHPh | 1 |
| —OH | 1 | — | 0 | —NHPh | 1 |
| —Cl | 1 | — | 0 | —NHPh | 1 |
| —OH | 1 | —CH$_3$ | 1 | —NHPh | 1 |
| —Cl | 1 | —CH$_3$ | 1 | —NHPh | 1 |
| —OH | 1 | —C$_2$H$_5$ | 1 | —NHPh | 1 |
| —Cl | 1 | —CH$_3$ | 1 | —NHPh | 1 |
| —OH | 1 | —C$_3$H$_7$ | 1 | —NHPh | 1 |
| — | 0 | —CH$_3$ | 1 | —NHPh(CH$_3$) | 1 |
| — | 0 | —CH$_3$ | 1 | —NHPh(CH$_3$) | 2 |
| — | 0 | —CH$_3$ | 1 | —NHPh(CH$_3$) | 3 |
| — | 0 | —OCH$_3$ | 1 | —NHPh(OCH$_3$) | 1 |
| — | 0 | —OCH$_3$ | 1 | —NHPh(OCH$_3$) | 2 |
| — | 0 | —OCH$_3$ | 1 | —NHPh(OCH$_3$) | 3 |
| — | 0 | —C$_2$H$_5$ | 1 | —NHPh(C$_2$H$_5$) | 1 |
| — | 0 | —OC$_2$H$_5$ | 1 | —NHPh(OC$_2$H$_5$) | 1 |
| —OH | 1 | — | 0 | —NHPhOH | 1 |
| —Cl | 1 | — | 0 | —NHPhCl | 1 |
| —OH | 1 | —CH$_3$ | 1 | —NHPh(OH)(CH$_3$) | 1 |
| —Cl | 1 | —CH$_3$ | 1 | —NHPh(Cl)(CH$_3$) | 1 |
| —OH | 1 | —C$_2$H$_5$ | 1 | —NHPh(OH) | 1 |
| —Cl | 1 | —CH$_3$ | 1 | —NHPh(Cl)(CH$_3$) | 1 |
| —OH | 1 | —C$_3$H$_7$ | 1 | —NHPh(OH)(CH$_3$) | 1 |
| — | 0 | —CH$_3$ | 1 | —NHnaphthyl | 1 |
| —OH | 1 | — | 0 | —NHnaphthyl | 1 |
| —Cl | 1 | — | 0 | —NHnaphthyl | 1 | wherein Ph is phenylene.

Illustrative aromatic amines of Formula V wherein "d" is zero and Ar is phenylene are phenylamine and aminophenols such as 2-aminophenol, 3-aminophenol, 4-aminophenol, 4-amino-3-methylphenol, 4-amino-3-chlorophenol, 4-amino-2-bromophenol and 4-amino-3-ethylphenol; amino-substituted polyhydroxyaryls such as the aminocatechols, the amino resorcinols, and the aminohydroquinones, e. g., 4-amino-1,2-dihydroxybenzene, 3-amino-1,2-dihydroxybenzene, 5-amino-1,3-dihydroxybenzene, 4-amino-1,3-dihydroxybenzene, 2-amino-1,4-dihydroxybenzene, 3-amino-1,4-dihydroxybenzene and the like.

Illustrative of aromatic amines of Formula V where in "d" is zero and Ar is naphthylene are aminonaphthols include 1-amino-5-hydroxynaphthalene, 1-amino-3-hydroxynaphthalene and the like.

When "d" in Formula V is "1", the aromatic amine can comprise a Mannich Base condensation product of at least one hydroxy-aromatic compound, aldehyde reactant and amine. The hydroxy-aromatic compounds can comprise one or more compounds of the formula (VII):

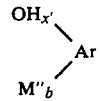

wherein x' is an integer of from 1 to 3, and Ar, M", and b are as defined above, with the proviso that the sum of x" and b is from 1 to "v", wherein "v" is the total number of available bonding sites on the unsubstituted Ar radical.

The aldehyde reactants will generally comprise at least one compound of the formula: HC(O)M''', wherein M''' is as defined above. Preferred are formaldehyde or paraformaldehyde, although it will be understood that other aldehyde-group containing compounds, such as C$_2$ to C$_{10}$ hydrocarbyl aldehydes (e.g., butyraldehyde, acetaldehyde, propionaldehyde, and the like) can also be employed. A preferred group of aldehyde materials are compounds of the formula: M''' CHO, wherein M''' is H or a hydrocarbon radical having from 1 to 4 carbon atoms.

The Mannich base condensation product formed by the reaction of the hydroxy aromatic compound with an amine reactant and formaldehyde can comprise higher condensation products which can be illustrated by adducts of the structure (VIII):

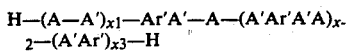

wherein $x_1$ is 0 or 1, $x_2$ is an integer of 0 to $x_3$ is 0 or 1, A is a bivalent bis-N terminated amino group derived from the amine reactant and comprises an amine group containing from 1 to 4 (preferably from 3 or 4) nitrogen atoms, and A' comprises the group —CH(T")— wherein T" is H or alkyl of from 1 to 9 carbon atoms and is derived from the corresponding aldehyde reactant, and Ar' comprises the moiety (IX):

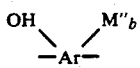

wherein M", b and Ar are as defined above for the hydroxy aromatic compounds of Formula VII. Generally adducts Formula VIII above are those wherein $x_1$ is 0, $x_2$ is 1 to 3, and $x_3$ is 1, and most preferably wherein M" is alkyl of 1 to 3 carbon atoms, Ar is phenylene.

Preferably, the "A" bivalent amino group in the adducts of Formula VIII will comprise terminal —NH— groups, as exemplified by the structures of the formula:

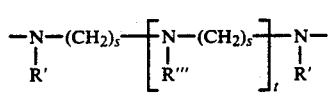

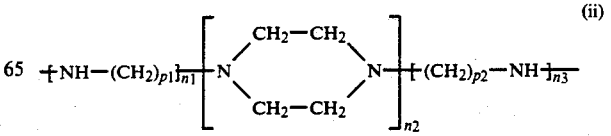

-continued $$-NH-\text{alkylene}-(-O-\text{alkylene}-)_{\overline{m}}-NH- \quad \text{(iii)}$$

wherein R', R", R''', s and t are as defined above with respect to Formula Ib; $p_1$, $p_2$, $n_1$ and $n_2$ are as defined above with respect to Formula II; and "alkylene" and "m" are as defined above with respect to Formula III.

Illustrative adducts of structure VIII are set forth in Table B below:

TABLE B

| $x_1$ | $x_2$ | $x_3$ | Ar' | A' | A |
|---|---|---|---|---|---|
| 0 | 2 | 1 | —Ph(OH)— | —CH$_2$— | —NHC$_2$H$_4$NHC$_2$H$_4$NH— |
| 0 | 2 | 1 | " | " | —NHC$_2$H$_4$(NHC$_2$H$_4$)$_2$NH— |
| 0 | 2 | 1 | " | " | —NHC$_2$H$_4$NH— |
| 0 | 2 | 1 | " | " | —NHC$_3$H$_6$NH— |
| 0 | 1 | 0 | " | " | —NHC$_2$H$_4$(NHC$_2$H$_4$)$_2$NH— |
| 0 | 0 | 0 | " | " | —NHC$_2$H$_4$(NHC$_2$H$_4$)$_2$NH— |
| 0 | 1 | 1 | " | " | —NHC$_2$H$_4$(NHC$_2$H$_4$)$_2$NH— |
| 1 | 2 | 0 | " | —CH(CH$_3$)— | —NHC$_2$H$_4$(NHC$_2$H$_4$)$_2$NH$^2$— |
| 1 | 0 | 1 | " | " | —NHC$_3$H$_6$(NHC$_3$H$_6$)$_2$NH— |
| 1 | 3 | 0 | " | " | —NHC$_3$H$_6$NHC$_3$H$_6$NH— |
| 1 | 1 | 0 | " | " | —NHC$_2$H$_4$NHC$_2$H$_4$NH— |
| 1 | 1 | 1 | " | " | —NHC$_3$H$_6$(NHC$_3$H$_6$)$_2$NH— |

(Ph = phenyl)

A preferred group of Mannich Base aromatic amine condensation products are those formed by condensing (A) hydroxy-aromatic compounds (e.g. phenol or $C_1$ to $C_4$ alkyl substituted phenol) with (B) formaldehyde and (C) polyethylene amines, e.g., ethylene diamine, diethylene triamine, triethylene tetraamine, propylene diamine, dipropylene triamine, tripropylene tetraamine, polyoxyethylene and polyoxypropylene diamines, e.g., polyoxypropylene diamine, and combinations thereof using a A:B:C molar ratio of 1-8:1:0.1-10, and preferably 2-6:1:1-4.

The Mannich Base condensation reaction to form the aromatic amines of Formula V above wherein "d" is one can be accomplished by means known in the art, such as the methods described in U.S. Pat. Nos. 3,442,808, 3,649,229 and 3,798,165 (the disclosures of which are hereby incorporated by reference in their entirety). Generally, the amine, hydroxy aromatic compound and aldehyde will be contacted at a temperature of from about 20° to 150° C. for a period of from about 1 to 10 hours, under $N_2$ or other inert gas, followed by stripping to remove unreacted amounts of the aldehyde and/or amine. Any convenient pressure can be employed, such as atmospheric, superatmospheric or subatmospheric.

Most preferably, when the aldehyde comprises formaldehyde (or a material which generates formaldehdye in situ), and the amine comprises a di-primary amine (e.g., triethylene tetraamine), the formaldehyde and diprimary amine are employed in an amount of about 2(n-1) moles of formaldehyde and about (n-1) moles of diprimary amine per "n" molar equivalents charged of the hydroxy-aryl group.

The amine treatment compound and metal salt product are contacted in the presence of a liquid medium which can comprise an inert diluent or solvent for the reactants. Generally useful are hydrocarbon solvents, such as mineral oils, synthetic lubricating oils, and the like. For example, the solvent employed in the preparation of the metal salt product can be passed to the amine contacting step.

The amine treatment compound can be readily reacted or complexed with the dicarboxylic acid metal salt material, e.g., the copper or zinc metal salt product of polyalkenyl substituted succinic anhydride, by contacting the selected amine compound with the metal salt product for a time and under conditions sufficient to react (or complex) the amine treatment compound with at least a portion of the polyolefinic substituted dicarboxylic acid metal salt product. Generally, the amine treatment compound and the metal salt product will be contacted with stirring at a temperature of from about 100° to 150° C., preferably 110° to 135° C., generally for 0.3 to 10, e.g., 30 min. to 3 hours. The contacting is preferably conducted in an inert atmosphere (e.g., under $N_2$). Treatment ratios of the dicarboxylic acid metal salt product to equivalents of amine treatment compound can vary considerably, depending upon the reactants and type of bonds formed. The selected amine treatment compound should be introduced in amount sufficient to provide an excess of reactive primary or secondary amine above that amount of reactive primary or secondary amine required for reaction with the equivalents of free polyolefinic substituted dicarboxylic acid or anhydride and for complexation with the metal in the metal salt product. Generally, the selected amine compound is introduced in amount sufficient to provide from about 1 to 10, preferably about 1.5 to 5, equivalents of reactive primary or secondary amine per mole of dicarboxylic acid moiety content of the polyolefinic substituted dicarboxylic acid or anhydride metal salt product so treated. After the desired contacting time, the contacting mixture is preferably stripped (e.g., with $N_2$ or other substantially insert gas) at elevated temperature (e.g., from about 120° to 150° C.) to remove water of reaction and remaining amine treatment compound which has not reacted or complexed with the metal salt product. Preferably, the recovered product will contain less than 1 wt. % (e.g., <0.05 wt. %) unreacted amine.

After stripping unreacted amine treatment compound and water from the reaction mixture, the product is filtered to remove process sediment and unconverted metal reactants (if the latter have not been sufficiently removed in filtering of the metal salt product charged to the amine reaction step of the process). The resulting solution will be generally characterized by a kinematic viscosity of from about 200 to 1400 cSt (at 100° C.).

The products prepared by the process of this invention will generally comprise from about 20 to 60 wt %, more typically from about 20 to 45 wt %, of the metal salt of the polyolefinic substituted dicarboxylic acid material (both amine complexed and uncomplexed), and from about 25 to 80 wt %, more typically from about 40 to 60 wt %, of a lubricating oil (e.g., a lubricating oil of the type conventionally used in crankcase lubricating oils as described below).

The lubricating oil additives prepared by the process of this invention, as described above, have advantageously improved viscosity properties and are useful as lubricating oil additives, e.g. as antioxidants, in internal combustion crankcase lubricating oils (e.g., automotive engines, which are fueled by gasoline, methanol, diesel and other conventional fuels). Accordingly, the additive can be used by incorporation and dissolution into an oleaginous material such as fuels and lubricating oils. When the additive mixtures of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to about 0.5, and preferably 0.005 to about 0.15 weight percent, based on the total weight of the composition, will usually be employed.

The additive mixtures of the present invention find their primary utility in lubricating oil compositions which employ a base oil in which the additive is dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

These lubricating oil formulations conventionally contain several different types of additives that will supply the characteristics that are required in the formulations. Among these types of additives are included viscosity index improvers (e.g., ethylene-propylene copolymer VI improvers, dispersant-viscosity improver polymers, and the like), supplemental antioxidants, corrosion inhibitors, detergents (e.g., neutral or basic (including overbased) alkali and alkaline earth metal salts of alkyl phenates, sulfurized alkyl phenates, alkylsulfonic acids, etc.), dispersants (e.g., high molecular weight ashless nitrogen- and ester-containing dispersants and the borated derivatives thereof), pour point depressants, antiwear agents (e.g., zinc dialkyldithiophosphates), friction modifiers (e.g., glycerol oleates), etc. Suitable such other additives for use in combination with the additives of the present invention are disclosed in U.S. Pat. Nos. 4,113,639; 4,173,540; 4,388,201; 4,502,970; and 4,797,219, the disclosure of each of which is hereby incorporated by reference in its entirety.

Having thus described the invention by direct disclosure and by example, it should be apparent to anyone having ordinary skill in this art that there exist equivalent reactants and variations of the process which are within the spirit of the invention as expressed in the claims which follow.

What is claimed is:

1. A low sediment method of producing an lubricating oil solution containing copper salts of polyolefinic substituted dicarboxylic acids comprising the steps of:

(a) contacting in a reaction zone a water soluble copper salt and a polyolefinic-substituted dicarboxylic acid anhydride material in the presence of water and lubricating oil, said polyolefinic substituent being derived from an olefin polymer of a $C_2$ to $C_{10}$ monoolefin having a number average molecular weight greater than about 600, and said dicarboxylic acid anhydride moiety being derived from a $C_4$ to $C_{10}$ monounsaturated acid anhydride material, said water being charged to said reaction zone in an amount of at least about 1,000 wt. % in excess of the amount of water theoretically required to hydrolyze the anhydride moieties in said polyolefinic-substituted dicarboxylic acid anhydride material, said contacting being performed for a time and under conditions sufficient to effect reaction of said water soluble copper salt and said dicarboxylic acid anhydride material to form a reaction liquid containing said copper salts of polyolefinic-substituted dicarboxylic acid and excess water; and (b) recovering said lubricating oil solution containing copper salt of polyolefinic-substituted dicarboxylic acid from said reaction liquid as a low sediment product.

2. The process of claim 1 wherein the dicarboxylic acid anhydride is derived from at least one member selected from the group consisting of maleic acid, maleic anhydride, itaconic acid, chloromaleic acid, dimethyl fumarate and chloromaleic anhydride.

3. The process of claim 2 wherein the polyolefinic substituent comprises polyisobutylene, polybutylene or mixtures thereof.

4. The process of claim 3 wherein the polyolefinic substituent is derived from a polymer having a number average molecular weight of from about 900 to 3000.

5. The process of claim 4 wherein the dicarboxylic acid anhydride comprises maleic anhydride.

6. The process of claim wherein said product contains less than about 1 vol. % sediment.

7. The process of claim wherein water is charged to said reaction zone in an amount of from 1,000 to 20,000 wt. % in excess of said theoretical hydrolysis amount.

8. The process of claim 7 wherein the polyolefinic substituent comprises polyisobutylene, polybutylene or mixtures thereof.

9. The process of claim 8 wherein the polyolefinic substituent is derived from a polymer having a number average molecular weight of from about 900 to 3000.

10. The process of any of claims 1-9 wherein said water soluble copper salt comprises a cupric salt.

11. The process of claim 10 wherein water is charged to said reaction zone in an amount of from about 1,500 to 10,000 wt. % in excess of said theoretical hydrolysis amount.

12. The process of claim 11 wherein said product contains less than 0.5 vol. % sediment.

13. The process of claim wherein said water soluble copper salt is cupric acetate or a hydrate thereof.

14. The process of claim 2 wherein said water soluble copper salt is cupric acetate or a hydrate thereof.

15. The process of claim 6 wherein said water soluble copper salt is cupric acetate or a hydrate thereof.

16. The process of claim 12 wherein said water soluble copper salt is cupric acetate or a hydrate thereof.

17. The process of claim 1 wherein the product of step (b) is contacted with a viscosity reducing effective amount of an amine selected from the group consisting of aliphatic, cycloaliphatic and aromatic amines containing from 1 to 4 nitrogen atoms per molecule, said amine having at least one primary or secondary nitrogen atom per molecule, under conditions sufficient to effect reaction or complexation of said amine with at least a portion of the polyolefinic substituted dicarboxylic acid metal salt product of step (a).

18. The process of claim 17 wherein the amine comprises at least one aliphatic saturated amine of the general formulas:

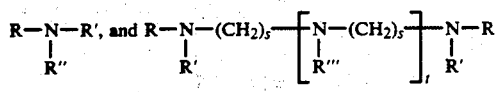

wherein R, R', R" and R''' are independently selected from the group consisting of hydrogen; $C_1$ to $C_{25}$ straight or branched chain alkyl radicals; and $C_1$ to $C_{12}$ alkoxy $C_2$ to $C_6$ alkylene radicals; and wherein R''' can additionally comprise a moiety of the formula:

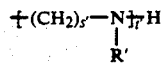

wherein R' is defined above, and wherein each s and s' can be the same or a different number of from 2 to 6, and t and t' can be the same or different and are each numbers of from 0 to 2, with the proviso that the amine contains not greater than 4 nitrogen atoms per molecule.

19. The process of claim 17 wherein the amine contains from one to two primary amine groups.

20. The process of claim 17 wherein the amine comprises at least one member selected from the group consisting of 1,2-diaminoethane; 1,3-diaminopropane; 1,4-diaminobutane; 1,6-diaminohexane; diethylene triamine; triethylene tetramine; 1,2—propylene diamine; di-(1,2-propylene)triamine; di-(1,3-propylene) triamine; N,N-dimethyl- 1,3-diaminopropane; N,N-di-(2-aminoethyl) ethylene diamine; N,N-di(2-hydroxyethyl)-1,3-propylene diamine; 2-propyldodecylamine; N-dodecyl-1,3-propane diamine; diisopropanol amine; diethanol amine; and N-(3-aminopropyl) morpholine.

21. The process of claim 17 wherein the amine comprises at least one of alicyclic diamines, heterocyclic nitrogen compounds, and N-aminoalkyl piperazines of the general formula:

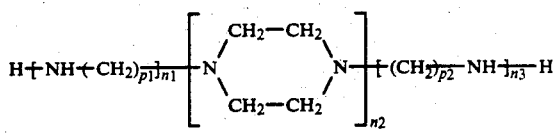

wherein $p_1$ and $p_2$ are the same or different and are each integers of from 1 to 4, $n_1$ and $n_3$ are the same or different and are each integers of from 0 to 3, and $n_2$ is 0 or 1, with the proviso that the sum of $n_1$, $n_2$ and $n_3$ is not greater than 3.

22. The process of claim 17 wherein the amine comprises diethylene triamine or triethylenetetramine.

* * * * *